Patented Nov. 6, 1934

1,979,324

UNITED STATES PATENT OFFICE 1,979,324

METHOD OF FLOATING HEMATITE

Antoine M. Gaudin, Salt Lake City, Utah

Application June 29, 1929, Serial No. 374,843

2 Claims. (Cl. 209—166)

This invention relates to the recovery of ores of the hematite type by flotation processes, either from a pulp containing the mineral alone or from a pulp containing silicious gangues.

The invention is further concerned with the recovery by flotation methods of feldspar and quartz or either feldspar or quartz from pulps containing them, by the use of certain activators.

The invention is particularly concerned with a pulp circuit in which the hydrogen ion concentration is controlled and the flotation operation carried out within certain pH limits in order to selectively float the desired material.

I have discovered by means of numerous experiments that with such flotation reagents as terpineol and sodium oleate, ores of the hematite type may be floated from a pulp containing the same, over a comparatively wide range of pH values. When pulps containing hematite also contain quartz or feldspar either with or without soluble activators for the latter, there exists a decidedly selective pH zone, within which hematite may be readily separated from such silicious gangues as above mentioned. At the same time these experiments have demonstrated the value of certain soluble activators for the recovery of quartz and feldspar where their use is desirable either for the recovery of these materials themselves or for ridding a pulp thereof.

Figure 1:
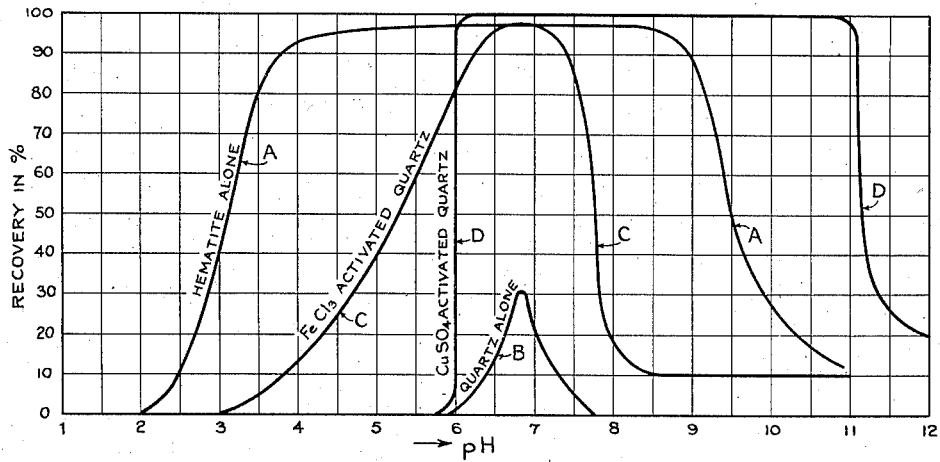
Figure 2:
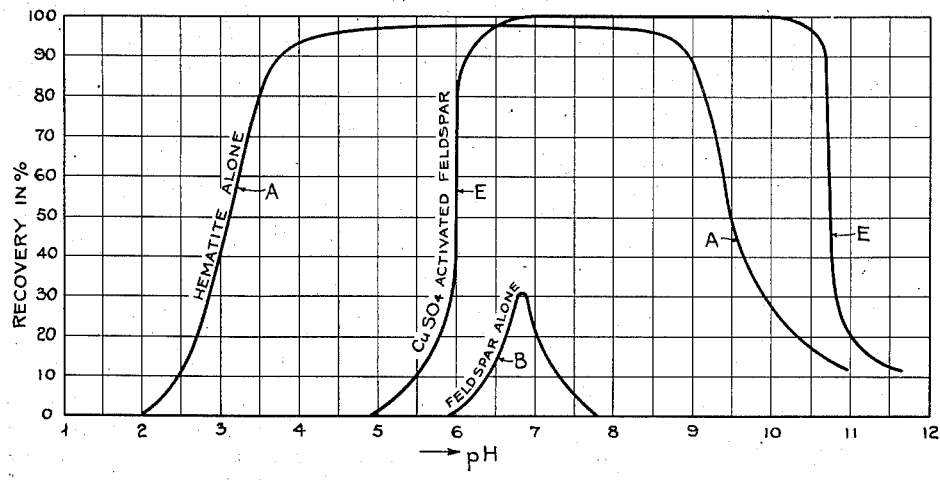

I have illustrated one application of the invention in the accompanying drawing in which:

Fig. 1 graphically shows curves representing the recovery of hematite alone from a pulp containing the same, and the recovery of quartz with and without the use of activators, and Fig. 2 is a graphical showing of the curves representing the recovery of hematite alone from pulps containing the same, and the recovery of feldspar with and without an activator.

All of the flotation processes here described were carried out in the usual manner, the material treated being first ground to between 100 and 600 mesh, the flotation reagents being approximately 0.2 lbs. terpineol per ton and 0.10 lbs. sodium oleate per ton. The hydrogen ion concentration was adjusted to the desired figure by the use of hydrochloric acid or caustic soda as required.

Referring to Fig. 1, curve A represents the recovery of hematite alone, from which it will be seen that by carrying out the operation as above outlined in a pulp having a pH value of from approximately 3.0 to 9.5 practically 100% recovery is assured.

Curve B in Fig. 1 represents the recovery of quartz from which it will be seen that 30% was the best recovery had in a pulp having an optimum pH value of 6.8. Inasmuch as the drop in recovery on each side of this optimum value is very sharp, it is a simple proposition to float hematite free from quartz in material amounts by maintaining the pH value of the pulp on which the flotation operation is conducted, between the pH values of 3 and 6 or 7.5 and 9.5.

My experiments have shown that certain materials when present in the pulp materially activate the flotation of quartz, and I have found that one of these materials is represented by ferric chloride. Curve C in Fig. 1 shows the recovery of ferric chloride activated quartz, which by contrast with curve B, indicates that substantially the same optimum pH value obtains but substantial amounts are floated over a much wider range. A comparison of these two curves indicates that hematite may be selectively floated from activated quartz where ferric chloride is the activator by adjusting the pH value of the pulp between approximately 3 and 4 or between 8 and 9.

Curve D in Fig. 1 represents the flotation of quartz activated by a material of which copper sulphate is a type. This curve indicates that copper sulphate is even a better activator than ferric chloride for quartz, and 100% recovery may be uniformly had by controlling the pH value of the pulp from 6.0 to 11.0.

By a comparison between curves A and D it will be found that a selective pH zone exists, and if the pulp is kept within these limits, hematite may be readily separated from quartz activated by copper sulphate. This range of pH is approximately from 3.0 to 6.0.

The above graph indicates also that where it is desirable either to recover quartz for its own value or for values contained therein, or for the purpose of ridding a pulp thereof, this may be done by adjusting the hydrogen ion concentration of the pulp as indicated, and resorting to the use of activators of either the ferric chloride or copper sulphate type.

My experiments have indicated that microcline feldspar follows substantially the same curve as quartz when subjected to a flotation operation in a pulp free from activators, and the recovery of this material is indicated in Fig. 2, curve B, which is similar to curve B in Fig. 1. The remarks made in connection with the recovery of quartz as shown in curve B apply here in regard to the flotation of feldspar.

By a comparison of curves A and B, Fig. 2, it will be apparent that hematite may be selectively floated away from feldspar in the absence of feldspar activators by adjusting the hydrogen ion concentration of the pulp to values between 3 and 6 or between approximately 7.5 and 9.

It has been demonstrated that feldspar of the above type may be activated by materials of the copper sulphate type using approximately 1.0 lb. per ton or its equivalent. The flotation of copper sulphate activated feldspar is indicated in curve E, Fig. 2, from which it will be seen that by maintaining the pH value of the pulp between approximately 6 and 10.7 practically 100% recovery may be had. By a comparison of curves A and E, Fig. 2, it will be seen that a zone exists in which hematite may be selectively floated from a pulp containing activated feldspar by maintaining the pH value thereof between approximately 3 and 6.

From the above it will be apparent that I have discovered an efficient method of recovering materials of the hematite type from pulps containing the same by a simple adjustment of the pH value thereof, and while this value range varies with the presence of silicious gangues, especially in the presence of activators therefor, yet selective zones do exist in which material recovery may be had of the hematite.

It will also be apparent that these same experiments have demonstrated clearly that a pulp containing silicious gangues of the quartz or feldspar type may be freed therefrom either for the purpose of recovering the quartz or feldspar or for the purpose of conducting further operations upon the pulp in the absence of these materials. Likewise by suitably adjusting the pH value of the circuit, quartz may be selectively floated from feldspar where desirable.

The ferric chloride and copper sulphate mentioned as activators are specific examples of such substances as many metallic salts perform this function, such as those of lead, zinc, nickel and many other base metals.

As far as the activation of quartz or feldspar is concerned, it should be mentioned that I have found that in circuits even as alkaline as pH 8, these materials are activated when a flotation operation is carried out in iron cells whereas it is not so activated where a celluloid cell is used. This indicates that a sufficient amount of iron is dissolved from the cell walls to activate this material.

It is, of course, to be understood that the curves shown in the drawing are merely illustrative and are not to be taken in a limiting sense.

What I claim is:

1. A process of recovering hematite from a pulp containing the same, and quartz and feldspar activated by copper sulphate, which consists in subjecting the same to a froth flotation operation, the pH value of the pulp being between 3.0 and 6.0.

2. A process of recovering hematite from a pulp containing the same, and quartz and feldspar activated by copper sulphate, which consists in subjecting the same to a froth flotation operation, the pH value of the pulp being between 3.0 and 6.0, and in the presence of a flotation reagent chosen from the group consisting of terpineol and sodium oleate.

ANTOINE M. GAUDIN.